United States Patent [19]

Trendov

[11] Patent Number: 4,662,428
[45] Date of Patent: May 5, 1987

[54] METHOD AND APPARATUS FOR CONTINUOUSLY SIZING, PREFORMING OR CASTING

[76] Inventor: Asparough O. Trendov, 509 Strasbourg Rd., Monroe, Mich. 48161

[21] Appl. No.: 827,279

[22] Filed: Feb. 7, 1986

[51] Int. Cl.⁴ .............................................. B22D 11/06
[52] U.S. Cl. ................................... 164/459; 164/479; 164/427; 164/429
[58] Field of Search ................ 164/427, 429, 459, 479

[56] References Cited

U.S. PATENT DOCUMENTS

| | | | |
|---|---|---|---|
| 1,863,371 | 6/1932 | Greene . | |
| 2,184,257 | 12/1939 | Nakagawa | 22/200 |
| 2,268,100 | 12/1941 | Zunkel | 164/427 |
| 2,486,388 | 11/1949 | Brinton | 22/75 |
| 2,843,895 | 7/1958 | Hallsworth | 22/77 |
| 3,750,742 | 8/1973 | Brusa | 164/427 |
| 3,771,586 | 11/1973 | Waring | 164/279 |
| 4,212,618 | 7/1980 | Hegler et al. | 425/326.1 |

*Primary Examiner*—Nicholas P. Godici
*Assistant Examiner*—Samuel M. Heinrich
*Attorney, Agent, or Firm*—Kinney & Lange

[57] ABSTRACT

A method and an apparatus for continuously sizing, preforming or forming metal objects include a plurality of molds arranged in a substantially vertical column and which collectively define a mold cavity. Each mold is separable into at least two mold sections. A retaining mechanism retains the molds in the vertical column. A mechanism separates the bottom mold into sections and removes the mold sections and positions the sections on a top mold of the column to form a new top mold. Preferably, the mechanism includes first and second arms which are rotatable between the bottom and the top mold positions and which grasp and move the mold sections from the bottom of the column to the top of the column.

13 Claims, 8 Drawing Figures

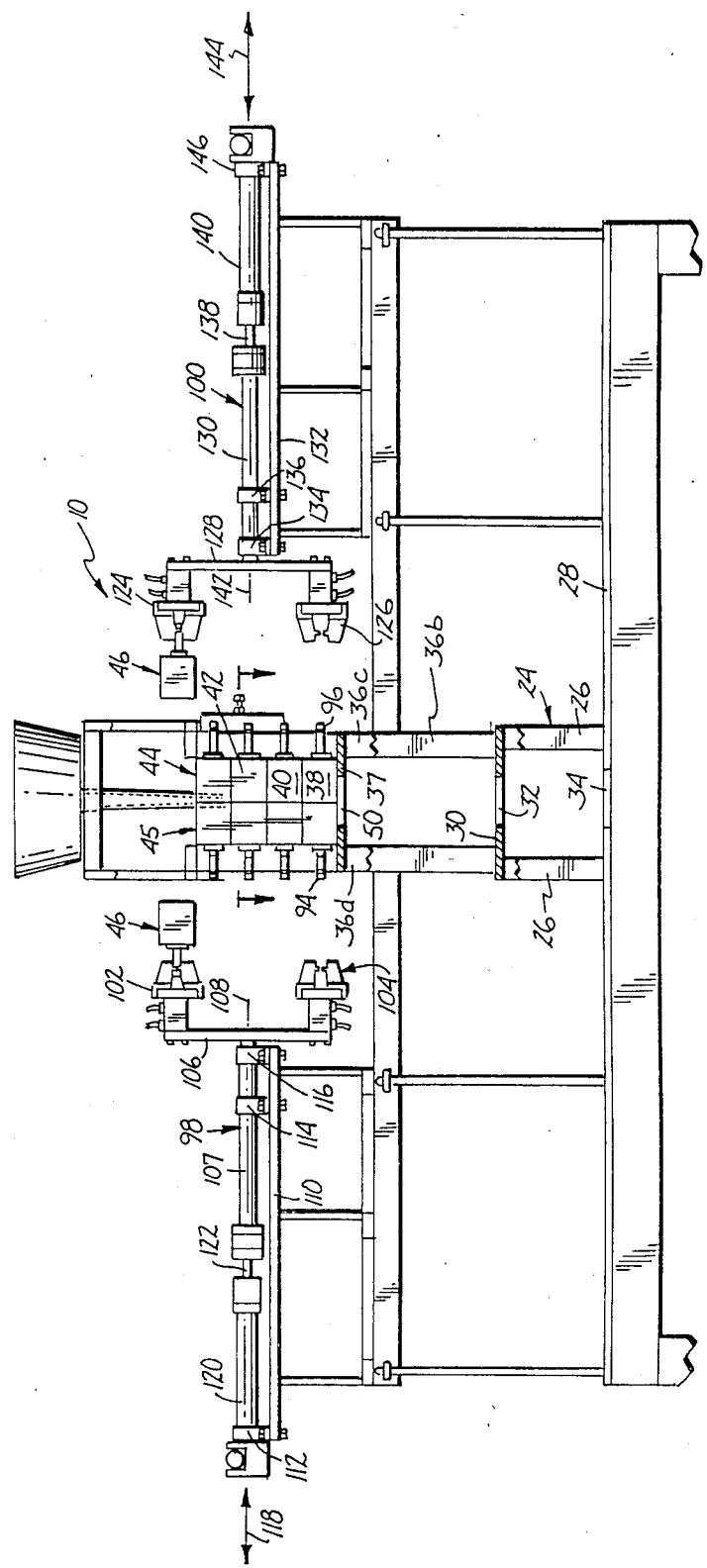

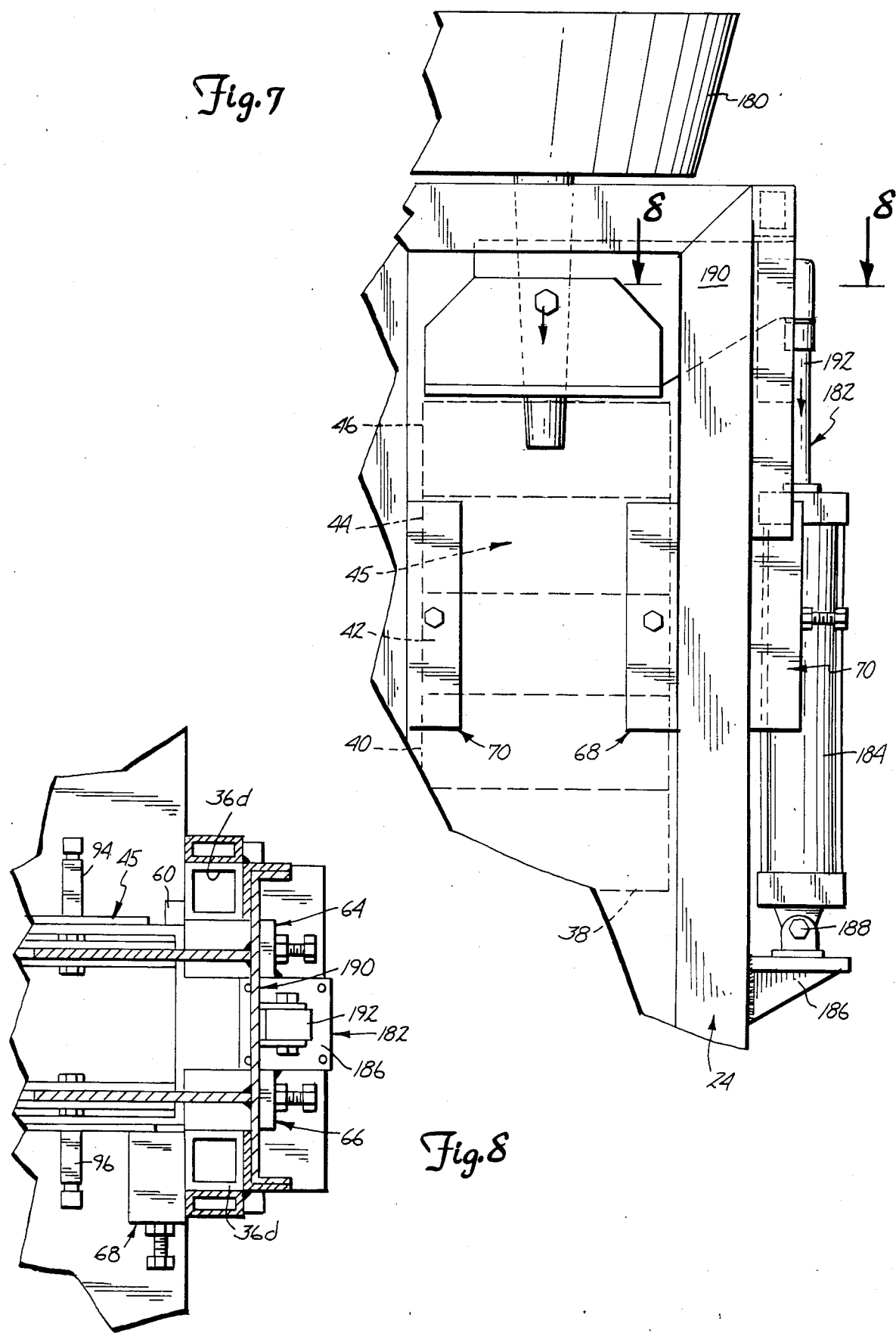

METHOD AND APPARATUS FOR CONTINUOUSLY SIZING, PREFORMING OR CASTING

BACKGROUND OF THE INVENTION

1. Field of the Invention

The present invention relates to continuous metal casting. In particular, it relates to the continuous casting of metal using a plurality of molds arranged vertically in a column, each mold separable into sections, such that the bottom mold is removed and placed on top of the column to form a continuous casting column.

2. Description of the Prior Art

Metal casting has been traditionally done using molds having individual and separated cavities for each part or item that is being molded. This molding procedure constitutes a "batch" type of process wherein the mold is reused. A batch process is inefficient in both the usage of labor and capital equipment since the mold is oftentimes being used to cool metal already solidified to a temperature in which it can be handled.

There have been several attempts in trying to develop continuous metal casting processes. The Waring U.S. Pat. No. 3,771,586 describes a continuous casting apparatus that includes a plurality of mold halves attached to two continuous vertical belts which bring the mold halves together to form a continuous casting column and which then separate the molds at a lower position, revealing the solidified metal. Although the Waring Patent describes a continuous caster, the continuous caster of the Waring Patent has half the molds not being used to cast metal at any one time. Since the molds are expensive, unnecessary capital is being used.

The Hallsworth U.S. Pat. No. 2,843,895 describes a wheel-type caster having individual molds disposed on the wheel and which are presented in a sequence to a pouring location, a molding box unloading station and a molding box loading station. Although the apparatus of the Hallsworth Patent may produce castings in a continuous manner, the molding process itself is still a batch process since each individual mold produces individual separate castings.

The Nakagawa U.S. Pat. No. 2,184,257 is similar in concept to the Hallsworth Patent in that it shows a centrifugal hollow ball casting machine in which individual molds are carried on an endless chain belt. The molds are charged with molten metal and rotated by an endless belt so that the molten metal inside the cavity is slung and distributed closely onto the cavity surfaces to form a hollow ball. However, each mold produces a distinct casting and in itself is a batch mold.

Further attempts in trying to develop a continuous casting process are described in the Green U.S. Pat. No. 1,863,371 and the Brinton U.S. Pat. No. 2,486,388. The Greene Patent shows a vertically disposed wheel having a plurality of molds disposed adjacently along the periphery of the wheel. Each of the molds is separated into two hinged halves. At a molten metal pouring position, the halves are brought together due to the rotation of the wheel and then opened when the metal has solidified dropping out the casting. The molten metal is continuously poured and the balls continuously drop out of molds that are being opened. However, such an arrangement is quite expensive since a large number of molds are needed and the wheel to rotate the molds must be structurally strong enough to handle the number of molds needed.

The Brinton Patent describes an apparatus that has a plurality of molds disposed on an inclined frame with two channels. The molds in the first channel proceed downwardly along an incline past a molten metal pouring station in which molten metal is poured along a slot in the mold and flows into the mold cavity. Each mold section defines a mold cavity with an adjacent mold section. When the metal has hardened at the bottom of the incline, the bottom-most mold section is broken away and pushed to a second channel on the incline, dropping the casting. The second channel on the incline includes a row of mold sections that are progressively pushed upwardly to resupply the first channel with usable molds. Again, this type of continuous metal casting process needs an excessive number of expensive molds.

In a plastic molding process, described in the Hegler et al U.S. Pat. No. 4,212,618, a plurality of molds are disposed in a horizontal row with the front end of the row being connected to an extruder from which molten plastic is supplied. A solidified plastic pipe exits the back end of the row. A plurality of rollers move the row of molds away from the extruder and a pair of arms grasp the mold halves at the end of the molding run and return the molds back toward the front end near the extruder. Although this is a continuous process, it is a plastic extrusion process unsuitable for processing of molten metal.

SUMMARY OF THE INVENTION

The present invention includes a method and an apparatus for continuously casting metal objects using a plurality of molds arranged in a substantially vertical column and which collectively define a substantially vertical mold cavity. Each mold includes at least two mold sections separable from each other. A retaining mechanism retains fthe molds in the vertical column. A mold positioning mechanism separates the mold sections of the bottom mold and removes the bottom mold sections and positions the sections on the top mold forming a new top mold. Preferably, the mechanism includes first and second arms, each arm rotatable between the bottom and the top mold positions for grasping and moving the mold sections.

BRIEF DESCRIPTION OF THE DRAWINGS

FIG. 2 is an elevational view of the apparatus of the present invention.

FIG. 7 is an enlarged fragmentary view of the pusher mechanism.

FIG. 8 is a cross sectional view taken along the line 8—8 in FIG. 7.

DETAILED DESCRIPTION OF THE PREFERRED EMBODIMENTS

Figure 1:
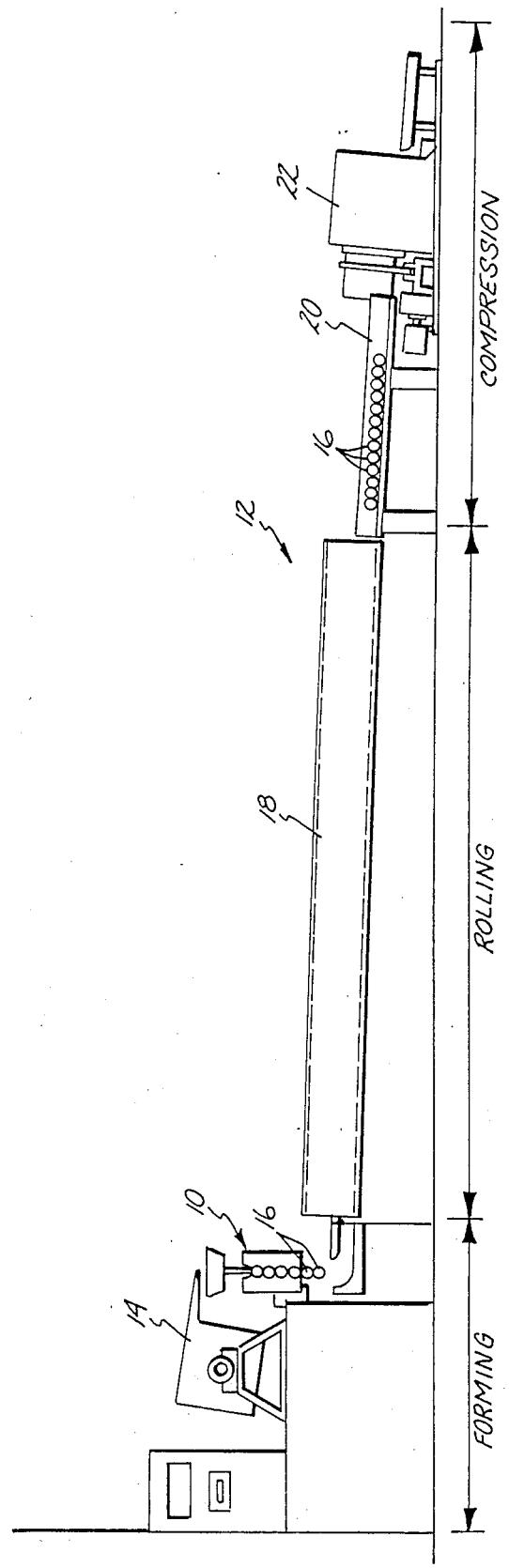
FIG. 1 is an elevational view of the apparatus of the pesent invention being used in a process for forming milling balls.

The apparatus of the present invention is generally indicated at 10 in FIG. 1 and is illustrated as part of an apparatus 12 for forming milling balls 16. The apparatus 12 includes a well known induction furnace 14 for melting metal and supplying molten metal to the apparatus 10 of the present invention. The apparatus 10 forms grinding balls 16. Grinding balls are shown for illustrative purposes and the apparatus 10 is used to form other objects. The grinding balls are then processed through a rotating tube 18 and through a chute 20 into a compression device 22. The tube 18 and the compression device 22 are described in U.S. Pat. No. 4,003,232 which issued to the same applicant as the applicant of the present application and is incorporated herein by reference.

It should be understood that although a specific example of the use of the apparatus 10 is given above, the apparatus 10 of the present invention is also usable in other processes, such as a forging process. The present invention has versatility in being used to cast metal objects of various shapes, especially in high volume situations, and is not limited to the specific example of FIG. 1. In particular, the apparatus 10 is useful in a high volume forging process for preforming such items as axe heads or hammer heads wherein the preformed hammer head is transferred to the forge in a solid but hot condition thereby conserving energy that is normally wasted in reheating cast objects which are subsequently forged. In addition, the present invention is useful in sizing operations.

As illustrated in FIG. 2, the present invention 10 is normally mounted on a frame structure 24. The particular configuration of the frame structure 24 is not particularly important to the present invention, but should be of sufficient strength to hold the apparatus 10 due to the weight of the molding blocks being used and the metal castings being produced. The frame structure 24 includes a bottom set of four legs 26 that are mounted on a floor 28. The legs 26 are joined at the top by a plate 30 having an aperture 32 located in a substantially central position of the plate 30. The floor 28 also has an aperture 34 in substantial vertical alignment with the aperture 32.

Four substantially vertical support members 36a, 36b, 36c and 36d are attached to the plate 30. Each support member is attached to the plate proximate a corner of the plate 30 and extends upwardly. A mold support plate 37 is fixedly attached to each of the members 36a, 36b, 36c and 36d. The plate 37 has a centrally located aperture 50 that is aligned coaxially with the apertures 32 and 34.

A plurality of molds 38, 40, 42, 44 and 46 are separated into two halves. The molds are arranged in a substantially vertical column 45 stacked one on top of the other. The molds are separable into halves and define a continuous substantially vertical casting cavity 92, as will be discussed subsequently.

The column 45 is disposed between the members 36a, 36b, 36c and 36d and is frictionally retained in a vertical position such that when the bottom mold 38 is removed, the remaining portion of the column does not drop down.

Figure 3:
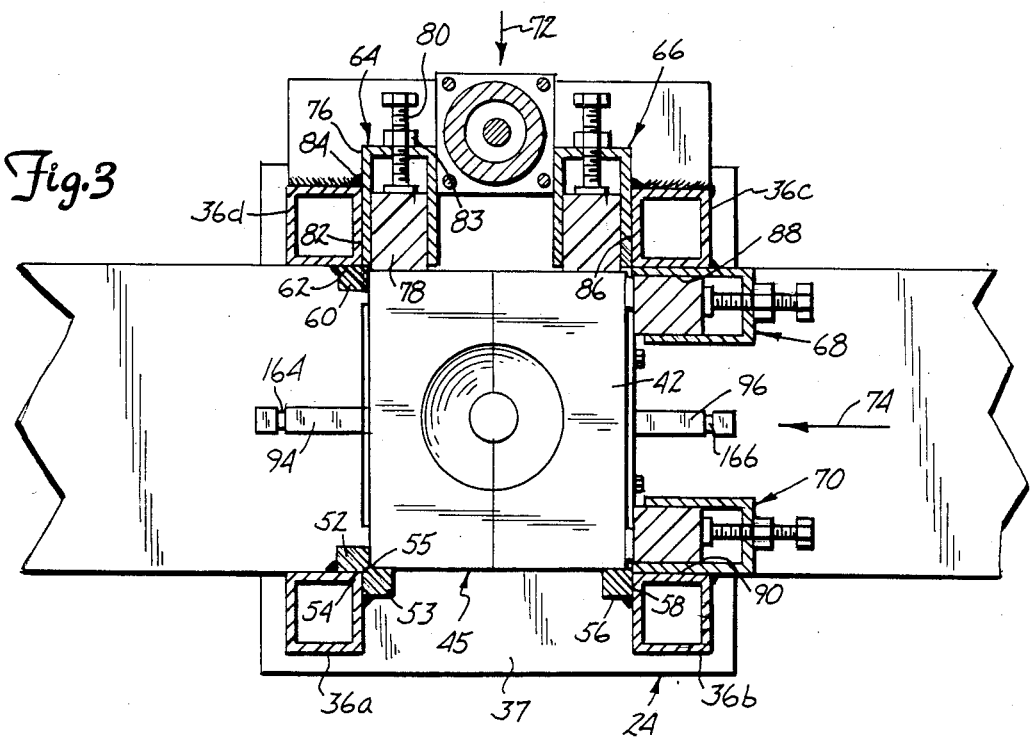
FIG. 3 is a cross sectional view taken along the line 3—3 in FIG. 2.

More specifically, the column 45 is frictionally held against retaining bars 52, 53, 56 and 60 by screw-type clamps 64, 66, 68 and 70, as best illustrated in FIG. 3. The retaining bars 52, 53, 56 and 60 and the screw-type clamps 64, 66, 68 and 70 extend along the members 36a, 36b and 36c and 36d to frictionally engage only molds 40, 42 and 44 so that the bottom mold 38 may be pulled out from the column and inserted on top of the column 45 as will be discussed subsequently.

The screw-type clamps 64 and 66 provide a force in the general direction of arrow 72 to frictionally hold molds 40, 42 and 44 against edges of the bars 53 and 56. The screw-type clamps 68 and 70 provide a force in the general direction of arrow 74 to frictionally hold molds 40, 42 and 44 against the bars 52 and 60.

The retaining bar 52 and the retaining bar 53 are welded along an inner facing corner 54, along oppositely disposed surfaces thereof, forming a corner 55 for retaining a corresponding corner of molds 40, 42 and 44. The retaining bar 56 is welded to member 36b along an edge surface 58. Similarly, the retaining bar 60 is welded to the member 36d along an edge surface 62.

Since the screw-type clamps 64, 66, 68 and 70 are of similar construction, only the clamp 64 will be described in detail with the understanding that clamps 66, 68 and 70 have like elements. The clamp 64 includes a housing 76, a friction bar 78 and a clamping bolt 80. The housing 76 is welded along a surface 82 to a surface 84 of the member 36d to retain the clamp 64 in a fixed position and to provide support for the clamping force. The clamping bolt 80 threadably engages a nut 83 welded to the housing 64 and, when turned, forces the friction block 78 against the molds 40, 42 and 44 to clamp the molds against the retaining bar 53. The screw-type clamp 66 is welded to the member 36c along a surface 86 and provides a force to frictionally clamp molds 40, 42 and 44 against the retaining bar 56. Similarly, the screw-type clamp 68 is welded to a surface 88 of member 36c and the screw-type clamp 70 is welded to a surface 90 of member 36b to provide a force to clamp the molds 40, 42 and 44 against retaining bars 60 and 52, respectively.

Figure 4:
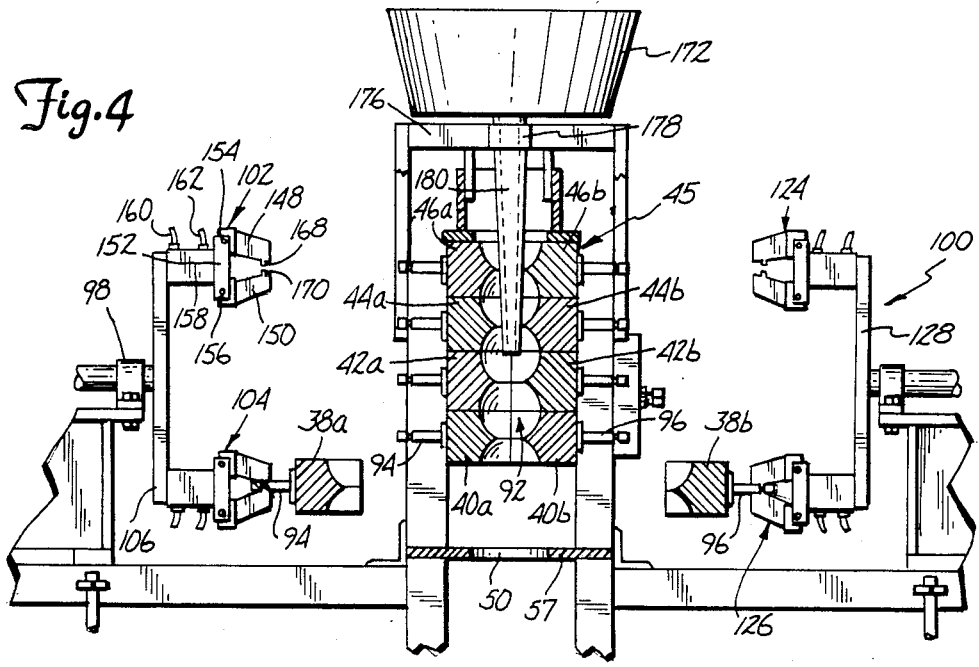
FIGS. 4–6 are elevational views of the apparatus of the present invention with portions being shown in cross section illustrating the operation of the apparatus of the present invention.

As previously discussed, each of the molds 38, 40, 42, 44 and 46 is separable into at least two mold sections. The mold sections of each of the molds will be referred to by the letter character a for mold sections illustrated on the left-hand side of the column, for example, mold section 38a, and the letter character b for mold sections illustrafted on the right-hand side of the column, for example, mold section 38b. As illustrated in FIG. 4 and previously described, the molds 38, 40, 42, 44 and 46, when positioned on top of each other in the vertical column 45, define the molding cavity 92 which extends throughout the length of the column 45. The molding cavity 92 is a true continuous molding cavity wherein molten metal is poured continuously, moves downwardly and solidifies continuously.

Referring back to FIG. 2, the molds are moved from the bottom of the column 45 to a top position on the column to provide the continuous molding cavity. Each of the mold sections has fixedly attached thereto and extending outwardly therefrom a mold handle. The mold handle is designated by 94 for each of the mold handles of the mold sections of the left side of the column, and designated by 96 for the mold handles of the mold sections on the right side of the column. The mold handles 94 are grasped by an arm mechanism 98 and the mold handles 96 are grasped by an arm mechanism 100.

The arm mechanism 98 includes an upper gripping jaw 102 and a lower gripping jaw 104. The gripping jaws are fixedly attached to a longitudinal connecting arm 106 that is rotatable about an axis 108. The arm 106 is fixedly attached to a rotatable connecting arm 107. The arm mechanism 98 is rotatably secured to a platform 110 by a plurality of bearing blocks 112, 114 and 115 which permit the rotation of the arm 106 and the gripping jaws 102 and 104. A stepper motor (not shown) provides the motive force for rotating the arm 106 and the gripping jaws 102 and 104.

The arm 106 and the gripping jaws 102 and 104 are also moved in a direction generally perpendicular to the column 45 as indicated by arrows 118 by a hydraulic cylinder 120 having a piston rod 122. The piston rod 122 is connected to the arm 106 and the gripping jaws 102 and 104 to move the jaws 102 and 104 toward and away from the column 45.

Similarly, the arm mechanism 100 includes gripping jaws 124 and 126 attached to a longitudinal connecting arm 128 that is rotatable about an axis 142. The arm 128 is fixedly attached to a rotatable connecting arm 130. The arm mechanism 10 is rotatably secured to a platform 132 by bearing blocks 134, 136 and 146. The connecting arm 130 is attached to a piston rod 138 of a hydraulic cylinder 140. Similar to arm mechanism 98, the arm mechanism 100 uses the hydraulic cylinder 140 to push the jaws 124 and 126 toward and away from the column 45 in the direction of arrows 144 and uses a stepper motor (not shown) to rotate the arm 128 and the jaws 124, 126 about the axis 142.

The jaws 102, 104, 124 and 126 are of similar construction and only the jaw 102 will be described in detail, with the understanding that the jaws 104, 124 and 126 have like elements. Referring to FIG. 4, the jaw 102 contains upper jaw clamping member 148 and lower jaw clamping member 150. The members 148 and 150 are pivotally attached to a connecting bar 152 at an upper pivot point 154 and a lower pivot point 156, respectively. The bar 152 is connected to the arm 106 by a transducer box 158. The jaw 102 is pneumatically operated. A pneumatic fluid, such as air, is supplied to the transducer box 158 by tubing 160 and 162 under pressure from a source (not shown) which selectively delivers air to the box 158 such that the jaw members 148 and 150 are forced apart and pushed together to grasp and release the mold handles.

Each of the mold handles 94 and 96 include notches 164 and 166, respectively, as best illustrated in FIG. 3. Referring back to FIG. 4, the upper jaw member 148 includes a notch-engaging protrusion 168 and the lower jaw member 150 includes a notch-engaging protrusion 170. The protrusions 168 and 170 extend from the respective jaw members toward each other. When the jaw 102 is in a closed position, the protrusions 168 and 170 engage the notch 164 so that the jaw securely holds the mold section, as illustrated by the lower jaw 104. The protrusions 168 and 170 disengage from the notch when the jaw members 148 and 150 are spread apart from each other and the jaw 102 is placed in an open position.

A pusher mechanism 182 is illustrated in FIGS. 7 and 8. The pusher mechanism includes a hydraulic cylinder 184 pivotally mounted on a base 186 that is fixedly attached to the frame structure 24. The hydraulic cylinder 184 is pivotally mounted using a pin 188. The pusher mechanism 184 further includes a pusher member 190 that is fixedly attached to a piston rod 192 of the hydraulic cylinder 184. The pusher member 190 extends over the column 45 for engaging the top mold 46.

Figure 5:
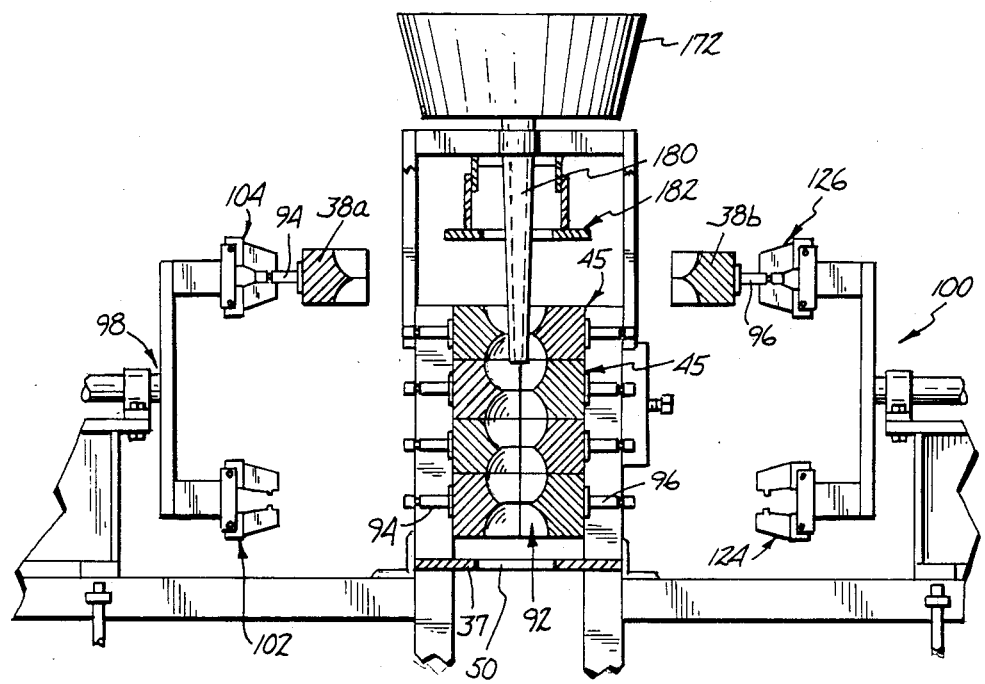
Figure 6:
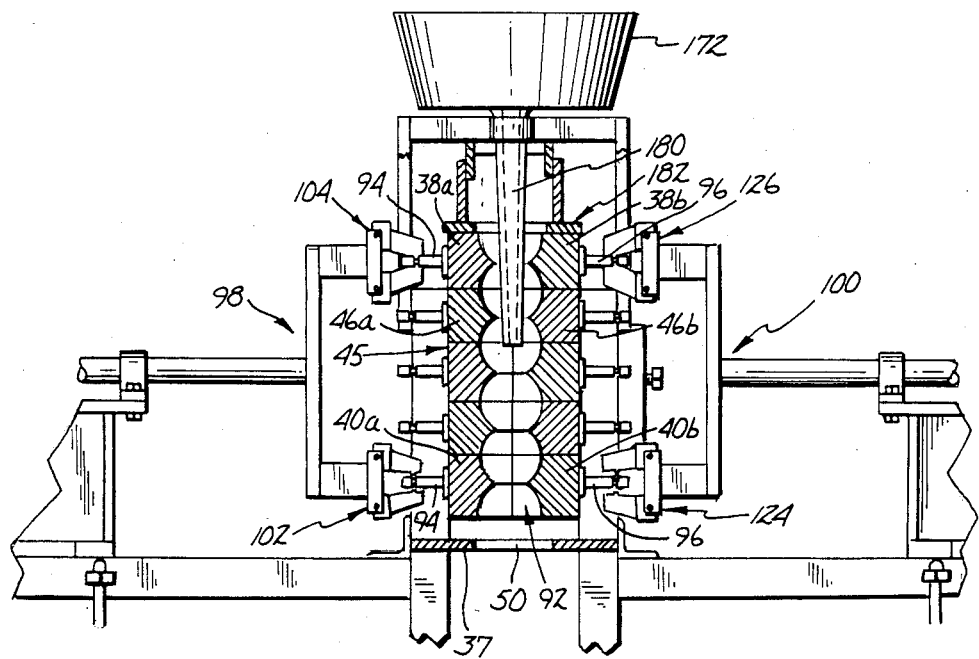

FIGS. 4–6 illustrate an operational cycle of the present invention. As stated previously, the molds 38, 40, 42, 44 and 46, when stacked, form the column 45 and a continuous mold cavity 92. Molten metal is supplied from a dish 172 to a funnel 174. Metal from the dish is poured into the funnel 174 manually or automatically. The manner of pouring the metal into the funnel is not particularly important to the present invention. The funnel 174 preferably rests on a platform 176 that is disposed above the column 45 and contains an opening 178 through which a nozzle 180 of the funnel extends into the mold cavity 92. The funnel 180 extends sufficiently into the cavity 92 to deliver molten metal such that air entrainment in the molten metal is minimized. In addition, the diameter of the funnel is smaller than the diameter of the mold cavity where the molds in the column meet adjacent molds so that air is permitted to escape up the column and out between the molds as the metal goes to the bottom of the mold.

It is believed that as the molten metal fills the cavity, the molten metal moves in a spiral movement eliminating any parting line and reduces interior shrinkage.

As the portion of the cavity 92 formed by mold 44 and lower portions of the cavity formed by mold 46 are filled with molten metal, the hydraulic cylinders 120 and 140 are actuated, moving the arm mechanisms 98 and 100 toward the column 45. Simultaneously, the pneumatic system is activated, opening the lowering gripping jaws 104 and 126 so that the jaws are open when approaching the mold handles 94 and 96 of the respective mold halves 38a and 38b. At the start of each cycle, the upper jaws 102 and 124 are also in an open position so that the handles 94 and 96 of the two mold sections 46a and 46b, respectively, do not block the movement of the lower gripping jaws. When the lower gripping jaws 104 and 126 are in position, the jaws are placed in a closed position with the protrusions of each of the jaw members engaging the notches of the respective mold handles. The hydraulic cylinders 120 and 140 are actuated to move the arm mechanisms 98 and 100 away from the column, removing the mold sections 38a and 38b. The column 45 is held vertically in place by screw-type clamps 64, 66, 68 and 70. The lowermost portion of the cavity 92 is exposed, revealing the metal in a solidifiedl cast form ready for further processing.

Referring to FIG. 5, the arm mechanisms 98 and 100 are rotated about the axes 108 and 142, respectively, placing them in an upper position as illustrated in FIG. 4. The mold sections 38a and 38b are now in position to be placed as the top-most mold sections on the column 45. Simultaneously with the rotation of the arm mechanisms 98 and 100, the pusher mechanism 182 has pushed down the column 45 to make room for the holds 38a and 38b.

The hydraulic cylinders 120 and 140 are then actuated to once again move the arm mechanisms 98 and 100 toward the column 45 to insert the mold halves 38a and 38b at the top of the column, as illustrated in FIG. 6. The mold halves 38a and 38b, when placed together at the top of the column, form the top portion of the mold cavity 92. While the mold halves 38a and 38b are being placed at the top of the column, metal is being continuously poured into the mold cavity filling the portion of the cavity formed by mold halves 46a and 46b. In addition, the upper gripping jaws 102 and 124, which have been rotated to a lower position, are actuated to open their respective jaw members to a position for engaging the mold handles 94 and 96 of the mold halves 40a and 40b, respectively. At approximately the same moment that the jaw members of the gripping jaws 102 and 126 release the mold handles 94 and 96 of the mold sections 38a and 38b, the jaws 102 and 124 grip the mold handles 94 and 96 of the mold sections 40a and 40b, respectively. The hydraulic cylinders 120 and 140 are then actuated, moving the arm mechanisms 98 and 100 away from the column 45 leaving the mold sections 38a and 38b in place at the top of the column and removing the mold sections 40a and 40b from the bottom of the column. The cycle is then repeated by rotating the arm mechanisms 98 and 100.

The present invention has usefullness in a preforming operation by simply increasing the speed at which the molds are moved from the bottom to the top. Long lengths of hot ribbon of various shapes can be made. The length of ribbon are formed at different speeds depending on the desired degree of solidification and the type of heat treatment needed for the subsequent forging, rolling or other finishing step.

In addition, the column of molds can be moved at an even greater speed to be used as a sizing operation in connection with apparatus described in the Trendov U.S. Pat. No. 4,003,232 wherein hot metal in a semi-liquid state are dropped in the rotating tube for further forming and solidification.

In summary, the apparatus of the present invention provides a mechanism for continuously casting metal using a minimum number of molds. Metal is continuously poured into the top of a column and the solidified castings are removed at the bottom with only one mold being idle at any one time.

A further important feature of the present invention is that the apparatus is changed over from forming one type of object to forming a differently-shaped object without any down time. When the bottom mold is pulled out of the column, the mold halves for forming a differently shaped object are placed on top of the column. Each bottom is replaced with a top mold for forming the differently shaped object until the column contains only the molds of the differently shaped object. The result is no down time with virtually no scrap in changing over.

Although the present invention has been described with reference to preferred embodiments, workers skilled in the art will recognize that changes may be made in form and detail without departing from the spirit and scope of the invention.

What is claimed is:

1. An apparatus for continuously casting metal objects, the apparatus comprising:
   a plurality of molds arranged in a substantially vertical column defining a mold cavity, each mold having at least two mold sections separable from each other and the column having a top mold and a bottom mold;
   means for retaining the molds in the substantially vertical column; and
   arms means for separating mold sections of the bottom mold and for removing the bottom mold sections and for positioning the bottom mold sections on the top mold of the column forming a new top mold wherein the arm means includes first and second arm mechanisms disposed on opposite sides of the column and each arm mechanism having first and second gripping jaws, means for rotating the gripping jaws, and means for positioning the gripping jaws towards and away from the column such that when the first gripping jaw is in a lowermost position, the first gripping jaw is movable towards the column to engage and pull out the bottom mold section, and the means for rotating rotates the first gripping jaw to an uppermost position and the second gripping jaw to a lowermost position, and the means for positioning positions the first gripping jaw such that the bottom-most mold section is positionable at the top of the column.

2. The apparatus of claim 1 wherein the means for positioning the gripping jaws toward and away from the column includes hydraulic cylinder means.

3. The apparatus of claim 1 wherein the means for retaining the molds in a substantially vertical column includes clamping means for frictionally engaging at least some of the molds between the top and the bottom molds of the column.

4. The apparatus of claim 3 wherein the means for retaining further includes first, second, third and fourth support posts spaced from each other and arranged to hold the molds in the column and wherein the clamping means includes first and second clamps attached to first and second posts for clamping the molds between the top and the bottom mold against the third and fourth posts and third and fourth clamps attached to the second and third posts for clamping the molds between the top and the bottom mold against the first and fourth posts.

5. The apparatus of claim 1 and further including means for engaging the top of the column to push the column down after the bottom-most mold sections are placed on top of the column.

6. The apparatus of claim 5 wherein the means for pushing includes a hydraulic cylinder means and a top mold-engaging member attached to the hydraulic cylinder means such that when the hydraulic cylinder is actuated, the mold-engaging member pushes down on the top mold and then returns to a position permitting another mold to be placed on top of the column.

7. A process for continuously casting metal objects comprising:
   a. arranging a plurality of molds in a substantially vertical column to define a continuous mold cavity, each mold having at least two mold sections separable from each other;
   b. frictionally retaining the molds positioned above the bottom mold in a selected vertical position;
   c. pouring metal into the mold cavity at the top of the column;
   d. providing an arm mechanism on both sides of the column with first and second means for gripping and separating the sections of the bottom-most mold from each other and positioning the sections at the top of the column to form a new top mold by rotation of the means for gripping;
   e. providing a force at the top of the column to overcome the frictional retaining force to move the column downwardly;
   f. repeating steps c, d and e to provide a continuous metal casting column.

8. An apparatus for continuously casting metal objects, the apparatus comprising:
   a plurality of molds arranged in a substantially vertical column defining a mold cavity, each mold having at least two mold sections separable from each other and the column having a top mold and a bottom mold;
   means for retaining the molds in the substantially vertical column including clamping means for frictionally engaging at least some of the molds between the top and the bottom molds of the column and first, second, third and fourth support posts spaced from each other and arranged to hold the molds in the column and wherein the clamping means includes first and second clamps attached to first and second posts for clamping the molds between the top and the bottom mold against the third and fourth posts and third and fourth clamps attached to the second and third posts for clamping the molds between the top and the bottom mold against the first and fourth posts; and arms means for separating mold sections of the bottom mold and for removing the bottom mold sections and for positioning the bottom mold sections on the top mold of the column forming a new top mold.

9. The apparatus of claim 8 and further including means for engaging the top of the column to push the column down after the bottom-most mold sections are placed on top of the column.

10. The apparatus of claim 9 wherein the means for pushing includes a hydraulic cylinder means and a top mold-engaging member attached to the hydraulic cylinder means such that when the hydraulic cylinder is actuated, the mold-engaging member pushes down on the top mold and then returns to a positon permitting another mold to be placed on top of the column.

11. An apparatus for continuously casting metal objects, the apparatus comprising:

a plurality of molds arranged in a substantially vertical column defining a mold cavity, each mold having at least two mold sections separable from each other and the column having a top mold and a bottom mold;

means for retaining the molds in the substantially vertical column;

arms means for separating mold sections of the bottom mold and for removing the bottom mold sections and for positioning the bottom mold sections on the top mold of the column forming a new top mold; and means for engaging the top of the column to push the column down after the bottom-most mold sections are placed on top of the column including a hydraulic cylinder means and a top mold-engaging member attached to the hydraulic cylinder means such that when the hydraulic cylinder is actuated, the mold-engaging member pushes down on the top mold and then returns to a position permitting another mold to be placed on top of the column.

12. A process for continuously casting metal objects comprising:
a. arranging a plurality of molds in a substantially vertical column to define a continuous mold cavity, each mold having at least two mold sections separable from each other;
b. providing clamping mechanisms on a plurality of support posts for frictionally retaining the molds positioned above the bottom mold in a selected vertical position;
c. pouring metal into the mold cavity at the top of the column;
d. separating the sections of the bottom-most mold from each other and positioning the sections at the top of the column to form a new top mold;
e. providing a force at the top of the column to overcome the frictional retaining force to move the column downwardly;
f. repeating steps c, d and e to provide a continuous metal casting column.

13. A process for continuously casting metal objects comprising:
a. arranging a plurality of molds in a substantially vertical column to define a continuous mold cavity, each mold having at least two mold sections separable from each other;
b. frictionally retaining the molds positioned above the bottom mold in a selected vertical position;
c. pouring metal into the mold cavity at the top of the column;
d. separating the sections of the bottom-most mold from each other and positioning the sections at the top of the column to form a new top mold;
e. providing a hydraulic cylinder to push down at the top of the column to overcome the frictional retaining force to move the column downwardly;
f. repeating steps c, d and e to provide a continuous metal casting column.

* * * * *